United States Patent [19]

Suzuki et al.

[11] Patent Number: 4,586,786
[45] Date of Patent: May 6, 1986

[54] AREA BEAM TYPE SPLITTER

[75] Inventors: Takashi Suzuki; Susumu Matsumura, both of Yokohama; Nozomu Kitagishi, Inagi, all of Japan

[73] Assignee: Canon Kabushiki Kaisha, Tokyo, Japan

[21] Appl. No.: 720,475

[22] Filed: Apr. 8, 1985

Related U.S. Application Data

[63] Continuation of Ser. No. 457,243, Jan. 11, 1983, abandoned.

[30] Foreign Application Priority Data

Jan. 14, 1982 [JP] Japan ................................ 57-4315

[51] Int. Cl.$^4$ ............................................. G02B 27/10
[52] U.S. Cl. ...................................... 350/169; 350/172
[58] Field of Search .................. 350/169, 172, 276 R, 350/276 SL; 354/155, 219, 224

[56] References Cited

U.S. PATENT DOCUMENTS

| | | | |
|---|---|---|---|
| 1,451,774 | 4/1923 | Holbrook et al. | 350/172 |
| 3,230,851 | 1/1966 | Reymond | 350/172 |

*Primary Examiner*—John K. Corbin
*Assistant Examiner*—P. M. Dzierzynski
*Attorney, Agent, or Firm*—Fitzpatrick, Cella, Harper & Scinto

[57] ABSTRACT

Disclosed is an area type beam splitter disposed in the light beam from an imaging optical system to split the light beam. This beam splitter has dot-like reflecting surfaces formed on a substrate. The dot-like reflecting surfaces are arranged at pseudo-random.

5 Claims, 11 Drawing Figures

(a)      (b)      (c)

AREA BEAM TYPE SPLITTER

This application is a continuation of application Ser. No. 457,243 filed Jan. 11, 1983, now abandoned.

BACKGROUND OF THE INVENTION

1. Field of the Invention

This invention relates to a beam splitter suitable for splitting part of an imaging light beam to form object images on or near a plurality of rows of photosensors such as CCD sensors in which a number of independent photoelectric conversion elements are arranged.

In an in-focus point detecting apparatus wherein, as in a camera with a focus indicator or an AF camera, a light-receiving device such as a CCD sensor is disposed on or near the substantial image plane within the camera and the focus adjusted condition is detected by means of object image information obtained from the light-receiving device, this invention is particularly useful as a device for splitting an imaging light beam while maintaining the imaging performance of the imaging light beam so that the light-receiving device may obtain accurate information of the focus condition.

2. Description of the Prior Art

As a beam splitter employed when it is necessary to maintain the imaging performance of an imaging light beam after it is split, use has almost been made of an amplitude division type beam splitter comprising a glass substrate having a dielectric semi-transparent film deposited thereon by evaporation.

However, such a dielectric semi-transparent mirror has suffered from the problem that the color characteristic and polarization characteristic of the light beam after being split are aggravated. The applicant has previously proposed in Japanese Patent Application No. 98524/1980 a beam splitter which solves such problem and yet incorporates therein an area type beam splitter which can be suitably utilized in an image processing system using image detecting elements such as CCDs arranged at a predetermined pitch.

FIG. 1 of the accompanying drawings in a model view for schematically illustrating the in-focus point detecting apparatus of a camera disclosed in Japanese Laid-open Patent Application No. 18652/1980 already filed by the applicant. During the in-focus, the image of an object, not shown, is formed on a predetermined image plane 5 by an imaging optical system 1. At this time, from the outputs from a sensor array 2 disposed immediately forwardly of the predetermined image plane, a sensor array 3 disposed on the imaging plane and a sensor array 4 disposed immediately rearwardly of the image plane, there are obtained time-serial electrical signals of illumination distributions corresponding to a blurred image, a sharp image and a blurred image as is schematically shown in FIGS. 1 (a), (b) and (c), respectively. Accordingly, the in-focus state, the front focus state or the rear focus state may be detected on the basis of the information obtained from these three sensor arrays. This in-focus point detecting method is described in detail in the aforementioned Japanese Laid-open Patent Application No. 18652/1980. As is described in that patent application, the sensor arrays need not always be three, but in-focus point detection can also be accomplished by two sensor arrays disposed immediately forwardly and rearwardly of the image plane.

FIG. 2 of the accompanying drawings is a schematic view showing the interior of a camera, and FIG. 3 of the accompanying drawings is an enlarged view of a portion thereof. The camera of FIGS. 2 and 3 is sectioned along a plane containing the optical system to enable the interior of the camera to be easily seen.

In FIGS. 2 and 3, an imaging light beam 6 from an imaging optical system (not shown) enters a quick return mirror 12 and part of it passes through the semi-transparent mirror on the surface thereof while the remainder of the light beam is reflected toward a finder system. The back of the quick return mirror is provided with a light-intercepting material for intercepting any other light than the light travelling to a mirror 13, and the light beam having entered the mirror 13 is reflected to provide an imaging light beam 14 which enters an a minute beam splitter for in-focus point detecting system provided below the mirror 13.

In FIG. 3, the imaging light beam 14 which has passed through the beam splitter 12, enters an area type beam splitter $9_1$ and is further split thereby, and the reflected light therefrom is split by an area type beam splitter $9_2$ and the light passed through the area type beam splitter $9_2$ is reflected by an ordinary mirror $9_3$ and thus, there are provided three imaging light beams $10_1$, $10_2$ and $10_3$, which enter three CCD line sensors $11_1$, $11_2$ and $11_3$, respectively.

FIG. 4 of the accompanying drawings is an enlarged view of a minute beam splitter portion 8. This minute beam splitter portion 8 is formed of a transparent substance such as $LASF_{016}$ having a refractive index nd=1.772 or BK7 having a refractive index nd=1.516, and the area type beam splitters $9_1$, $9_2$ and the ordinary mirror $9_3$ are provided in the minute beam splitter portion 8.

The transparent material used for the minute beam splitter portion also has the function of adjusting the optical path length difference (amount of defocus) between the imaging light beams entering sensors $11_{1-3}$, by the refractive index thereof.

As the amount of blur of the image for each sensor to detect the in-focus point, although it depends on the logic of the focus detecting system and the type of the interchangeable lens used, it is desirable that the optical path length differences between the imaging light beams $10_1$ and $10_2$ and between the imaging light beams $10_2$ and $10_3$ be 0.2–1.0 mm as converted into the optical path length difference in the air (actual optical path length/refractive index of the medium) and correspondingly thereto, the spacing d between the line sensors is set to the order of 0.5–2.0 mm.

Also, the spacing 1 from the position whereat the imaging light beams $10_1$, $10_2$ and $10_3$ enter the surfaces of the respective beam splitters $9_1$, $9_2$ and $9_3$ to the surface of each sensor is 1–2 mm as converted into the optical path length in the air, and the pitch P between the segments of CCD line sensors $11_1$, $11_2$ and $11_3$ is about 30 μm.

In the minute beam splitter portion of such construction, as shown in FIG. 4, area type beam splitters (random dot mirrors) $9_1$ and $9_2$ each having small circular transmitting portions arranged at random are disposed at an angle of 45° with respect to the sensor surface. The random dot mirror $9_1$ is designed such that the quantity of light T transmitted therethrough is T=about 33% ±about 2% as calculated simply in the area ratio between the light transmitting portion and the light reflecting portion when the mirror surface is scanned in the direction of sensor arrangement by an imaging light beam corresponding to F5.6–F8, and the random dot mirror $9_2$ is designed such that T=about 50% ±about 3%. Strictly, the area ratio is determined with the absorption characteristic of the reflecting film and the intensity distribution of the point image taken in account. The reason why the small circles are disposed at random is that the degradation of the intensity distribution of the point image will become great due to diffraction if they are disposed periodically, or to avoid a situation in which, where there are light beams passing through two area type mirrors $9_1$ and $9_2$ as shown in FIG. 4, moire is created between the patterns on the mirror surfaces and an error is caused in intensity ratio between the sensors or uniformity is lost when the sensor surface is illuminated by a uniform light beam. However, if the arrangement of the small circles is too random, non-uniformity will be caused in the illumination of the sensor surface and therefore, care must be taken of the balance of the arrangement.

It is desirable that the average size of the minimum diameter of the light transmitting portion or the light reflecting portion on the light splitting surface of the area type beam splitter indicated by small circles in FIG. 4 be greater than 1/100 and smaller than 1/10, where l is the air-converted optical path length from the beam splitter to the sensor surface. The reason is that if said average size is smaller than 1/100, MTF of the split light will be remarkably reduced and if said average size is greater than 1/10, the uniformity of the image will be aggravated when a lens of F5.6 or F8 is used and the light beam for imaging each point becomes thin. According to our experiment, the optimum value in the balancing of such value of MTF and the uniformity was about 1/30 in the case of the previously described sensor.

The incident light beam 14 is split by the use of the area type beam splitters $9_1$ and $9_2$ and the respective split imaging light beams $10_1$, $10_2$ and $10_3$ are directed to CCD line sensors $11_1$, $11_2$ and $11_3$ and the amount of blur of the image is detected as shown in FIG. 1, whereby the focus adjusted condition can be known. In order to accurately know the proper focus adjusted condition, it is necessary that in each beam splitter, beam splitting be effected with the three imaging light beams $10_1$, $10_2$ and $10_3$ being substantially at the ratio of quantity of light of 1 : 1 : 1 so that there is no difference in color characteristic and polarization characteristic. The area type beam splitter is less expensive as compared with a dielectric semi-transparent mirror and can satisfy the above condition.

Where the beam splitter is adapted for use with a focus detecting apparatus, it is desirable that balance be kept with respect also to the MTF of the imaging optical system up to the respective sensors $11_1$–$11_3$. This is because, as described in the aforementioned Japanese Laid-open Patent Application No. 18652/1980, it is preferable for a focus detecting apparatus using the blur detecting method to detect the in-focus position by comparing the integrated values of the differences in output between adjacent segments with respect to the respective sensors.

Accordingly, when a camera is turned to an object of uniform brightness, no signal should be produced in the in-focus detecting apparatus of the blur detecting type as shown in FIG. 1, but when the pattern of the area type beam splitter is projected upon the sensor surface, some signal may be produced to effect a wrong focusing operation.

SUMMARY OF THE INVENTION

It is an object of the present invention to provide an area type beam splitter having a pattern which is not liable to be projected upon sensors.

To achieve this object, the dot mirrors of the present invention are disposed at pseudo-random, namely, at random if viewed microscopically, and periodically if viewed macroscopically.

The invention will become fully apparent from the following detailed description thereof taken in conjunction with the accompanying drawings.

DETAILED DESCRIPTION OF THE PREFERRED EMBODIMENTS

Embodiments of the present invention will hereinafter be described with reference to FIG. 5 and so forth.

Figure 1:
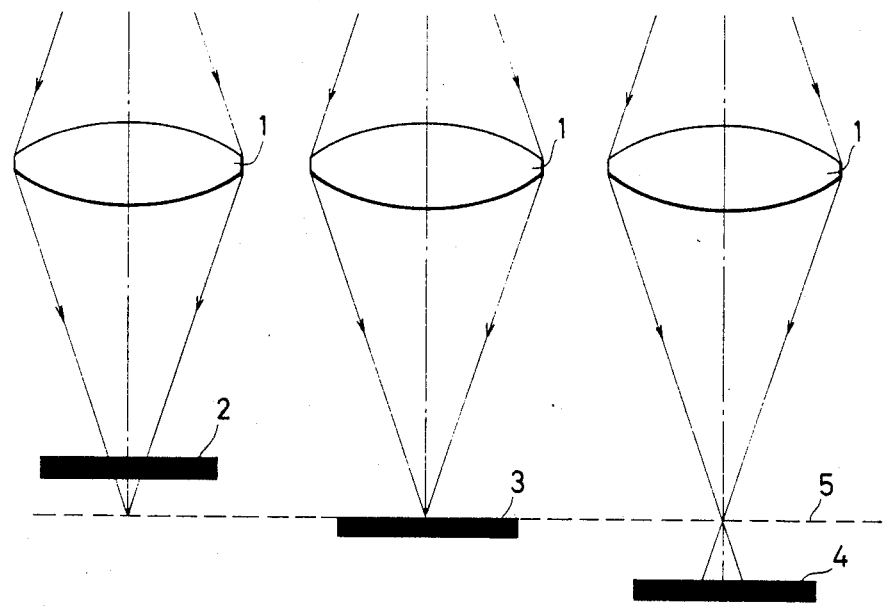
FIGS. 1 (a), (b) and (c) schematically illustrate an in-focus point detecting apparatus.
Figure 1:
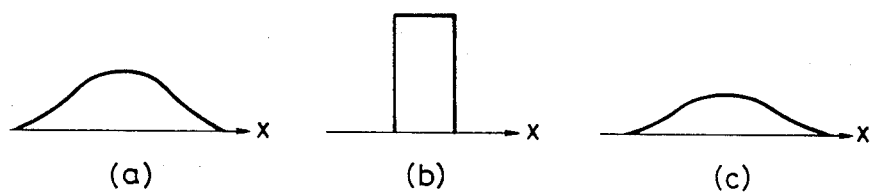
Figure 2:
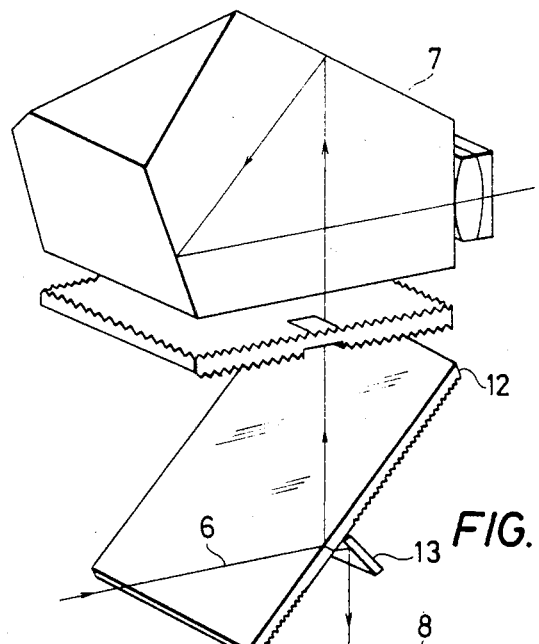
FIGS. 2 and 3 schematically show the beam splitter of the prior art incorporated in a single lens reflex camera.
Figure 3:
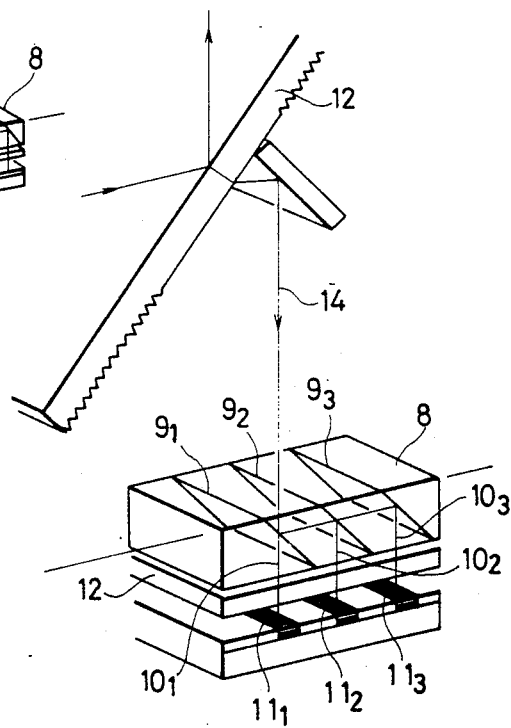
Figure 4:
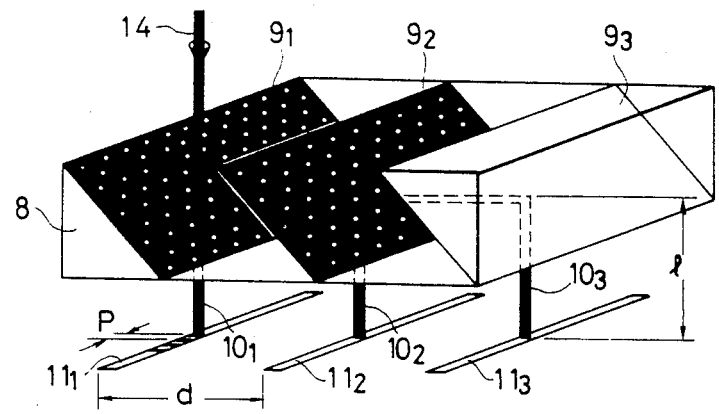
FIG. 4 shows the area type beam splitter of FIG. 3.
Figure 5:
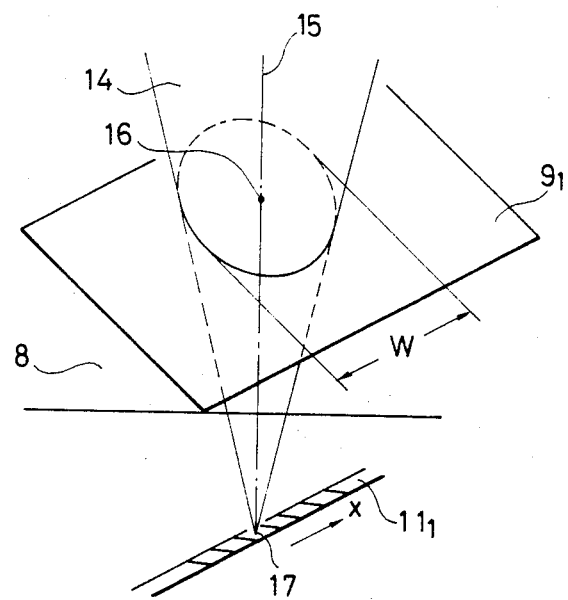
FIG. 5 shows the spatial arrangement of the area type beam splitter of the present invention and sensors.

In FIG. 5, it is to be understood that the light beam 14 from an imaging lens (not shown) is imaged at a point 17 on a sensor row $11_1$. At this time, the cross-sectional shape in which the light beam 14 intersects the surface $9_1$ of the obliquely disposed beam splitter is an ellipse, and the minor diameter of this ellipse is W. This W is varied by the F-number of the imaging lens, and is determined to a predetermined value, namely, a relatively great F-number with which the dot pattern of the beam splitter is liable to be projected upon sensors, for example, F5.6 or F8.

When the point at which the optical axis 15 intersects the surface $9_1$ of the beam splitter is 16, the air-converted optical path length from the point 16 to a point 17 is l.

Figure 6:
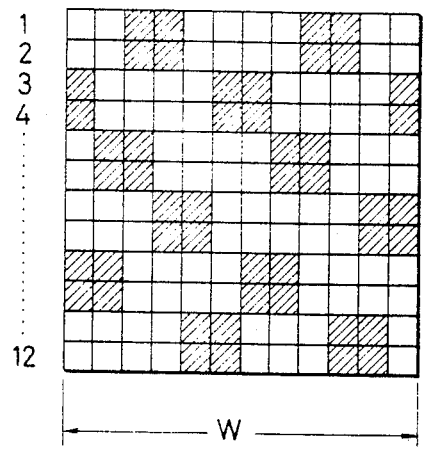
FIGS. 6 and 7 show the mirror pattern of the area type beam splitter of the present invention.

FIG. 6 shows an embodiment of the mirror pattern on the area type beam splitter $9_1$. FIG. 6 also shows the dimensions W×W of a part of the surface $9_1$ and in FIG. 6, hatched portions indicate the portions which transmit light therethrough, and a highly reflective film of a metal such as Al is deposited by evaporation on the other portion than the hatched portions. When the square of W×W is partitioned into 12 columns×12 rows, the area occupied by the hatched portions in each column or each row is 4/12=⅓=33.3 (%). A plurality of patterns shown in FIG. 6 are disposed adjacent to each other horizontally and vertically on the surface $9_1$ and the average transmission factor is 33.3%, and 66.6% of the incident light is reflected. Actually, there is some absorption in the metallic reflecting film as well and therefore, to enhance the accuracy of the light splitting ratio, the area ratio is determined with such a phenomenon taken into account.

Figure 7:
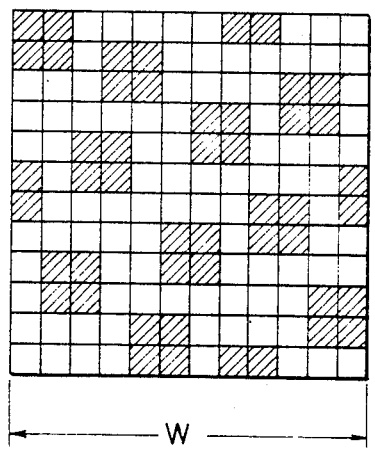

Another example of the mirror pattern is shown in FIG. 7. Again in this embodiment, the area of the hatched portions in the square W×W is 33.3%, and a number of patterns as shown in FIG. 7 are spread all over the surface $9_1$ of FIG. 5.

Figure 8:
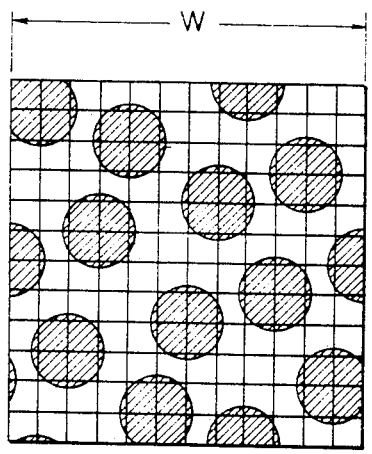
FIG. 8 shows another mirror pattern.

Another embodiment of the present invention will now be described with reference to FIGS. 8 and 9. In FIG. 8, the shape of the light transmitting portions is circular and the center of each circle is coincident with the center of gravity of each square of FIG. 7 which is the light transmitting portion. Also, the area of each circle is equal to the area of each square.

Figure 9:
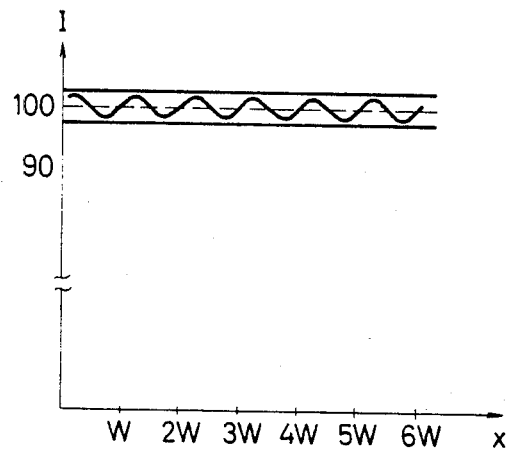
FIG. 9 shows the light distribution on the sensor surface when the area type beam splitter of the present invention is used.

FIG. 9 shows the distribution of quantity of light on the sensor surface when the patterns of FIG. 8 are densely spread or disposed with no opening over the beam splitter surface $9_1$ of FIG. 5 and the surface $9_1$ is uniformly illuminated by a light beam of F5.6. Further, FIG. 9 shows the distribution of quantity of light when the sensor surface is scanned in the direction of sensors by a light beam of F5.6 converged on the sensor surface, and it will be seen that the distribution of quantity of light has a periodicity equal to the basic mirror pattern width W. However, the fluctuation range thereof has been within 5% as designed. When the mirror of FIG. 9 is illuminated by a light beam of F-number smaller than F5.6, the period becomes substantially smaller than the W of this light beam of F. number F5.6. In the case, the irregularity of the quantity of light becomes lower than 5%.

In FIG. 5, if $l/W = 5.6$ and when the mirror pattern is that of FIG. 6 or 7 and the incident light beam is a one-dimensional light beam of F5.6, no irregularity of the quantity of light is created from the first.

According to the method of the present invention, the pattern in which the irregularity is rarely created from the first is a starting point and, if the cross-sectional shape of the light beam 14 of FIG. 5 and the mirror pattern are determined, any irregularity of quantity of light on the sensor surface can be immediately found by means of a computer.

Further, according to the mirror pattern of the present invention, as already described in connection with the previous proposition, the shape and size of the individual light transmitting portions can be controlled correspondingly to the optical path length l from the sensor surface to the area type beam splitter, whereby the MTF of the image formed on the sensor surface can be controlled.

In the area type beam splitter of the present invention, the average transmission factor is not limited to 33.3% and the shape of the light transmitting portions is not restricted to a square or circle, but may be an ellipse or other other, or the shape of the light transmitting portions and the shape of the reflecting portions may be replaced with each other and, to eliminate the irregularity as shown in FIG. 9, the position of each light transmitting/reflecting element may be shifted.

As described above, in an in-focus detecting apparatus using the area type beam splitter of the present invention as the beam splitting device, when a uniform imaging light beam has entered, it never happens that the split ratios of two light beams differ from each other due to the difference in spectral reflection factor resulting from each wavelength or that irregularity of quantity of light is created on the sensor surface by the random patterns and a signal is produced as if some image were formed, and the manufacturing process of the beam splitter becomes very similar to the IC pattern mask manufacturing method and thus, stability and low cost of production are brought about.

With regard to uniformity, it has been ascertained that if it is selected within a certain limit with respect to the maximum F-number which the imaging lens can assume, for example, F5.6, the uniformity can be more enhanced in the case of smaller F-numbers.

What is claimed is:

1. An area type beam splitter comprising:
a substrate having a beam splitting surface thereon, said surface being defined by a plurality of contiguous small sections disposed with no spaces therebetween, each small section including a plurality of minute reflecting surfaces with the remainder of the section being transmissive, said reflecting surfaces being randomly arranged therein, the random arrangement of minute reflecting surfaces being repeated in each of said small sections defining said beam splitting surface.

2. An area type beam splitter according to claim 1, wherein the size W of each small section is equal to that over which a point imaging light beam of a predetermined F-number from an imaging optical system in which said area type beam splitter is used irradiates said beam splitting surface.

3. An area type beam splitter according to claim 2, wherein said F-number is 5.6.

4. A beam splitting device according to claim 2, wherein said area type beam splitter is an area type beam splitter in which reflecting surfaces having a minimum width of the order of 1/10–1/100 are distributed when the distance between said beam splitter and the imaging plane along the optical axis of an imaging system for forming said imaging light beam is l.

5. An area type beam splitter comprising:
a substrate having a beam splitting surface thereon, said surface being defined by a plurality of contiguous small sections disposed with no spaces therebetween, each small section including a plurality of minute transmitting surfaces with the remainder of the section being reflective, said transmitting surfaces being randomly arranged therein, the random arrangement of minute transmitting surfaces being repeated in each of said small sections defining said beam splitting surface.

* * * * *

UNITED STATES PATENT AND TRADEMARK OFFICE
CERTIFICATE OF CORRECTION

PATENT NO. : 4,586,786
DATED : May 6, 1986
INVENTOR(S) : TAKASHI SUZUKI, ET AL.

It is certified that error appears in the above-identified patent and that said Letters Patent is hereby corrected as shown below:

Column 1 line 43, "in" should read --is--;
    line 51, "imaging" should read --image--.

Column 2 line 16, "an a" should read --a--;
    line 17, "for in-focus" should read --for an in-focus--.

Column 5 line 27, "F.number" should read --F-number--;
    line 27, "the" should read --this--.

Column 6 line 31, "claim 1" should read --claim 1 or 5--.

Signed and Sealed this

Twenty-fourth Day of March, 1987

Attest:

DONALD J. QUIGG

Attesting Officer      Commissioner of Patents and Trademarks